United States Patent [19]
de Cleur et al.

[11] 3,893,978
[45] July 8, 1975

[54] PULVERULENT COATING AGENTS BASED ON BLOCKED AROMATIC DIISOCYANATES

[75] Inventors: Eckhard de Cleur, Duisburg; Rolf Dhein; Hans Rudolph; Hans-Joachim Kreuder, all of Krefeld, Germany

[73] Assignee: Bayer Aktiengesellschaft, Leverkusen, Bayerwerk, Germany

[22] Filed: Mar. 22, 1973

[21] Appl. No.: 343,798

[30] Foreign Application Priority Data
Mar. 28, 1972 Germany............................ 2215080

[52] U.S. Cl.......... 260/77.5 TB; 117/17; 260/22 TN
[51] Int. Cl.²...................... C08G 22/32; B05B 5/00
[58] Field of Search............................. 260/77.5 TB

[56] References Cited
UNITED STATES PATENTS

| | | |
|---|---|---|
| 2,698,845 | 1/1955 | Mastin et al. ................ 260/77.5 TB |
| 2,801,990 | 8/1957 | Seeger et al. ................ 260/77.5 TB |
| 3,621,000 | 11/1971 | Schmelzer et al. .......... 260/77.5 TB |
| 3,659,003 | 4/1972 | Johnson et al. .............. 260/77.5 TB |
| 3,660,355 | 5/1972 | Johnson et al. .............. 260/77.5 TB |
| 3,660,359 | 5/1972 | Labana ......................... 260/77.5 TB |
| 3,676,402 | 7/1972 | Matsui et al. ................ 260/77.5 TB |
| 3,676,405 | 7/1972 | Labana ......................... 260/77.5 TB |
| 3,703,499 | 11/1972 | Lindemann................... 260/77.5 AT |
| 3,711,571 | 1/1973 | Farah............................ 260/77.5 TB |
| 3,721,647 | 3/1973 | Mazzeo et al................. 260/77.5 TB |
| 3,748,315 | 7/1973 | Wooster et al. .............. 260/77.5 TB |
| 3,770,703 | 11/1973 | Gruber et al. ................ 260/77.5 TB |

*Primary Examiner*—H. S. Cockeram
*Attorney, Agent, or Firm*—Connolly and Hutz

[57] ABSTRACT

Object of the invention is a pulverulent coating agent curing at a temperature above 130°C comprising (a) at least one polymer contaning hydroxyl groups and having a softening point of at least 40°C, and (b) an with ε-caprolactam masked product consisting of an aromatic polyisocyanate and a dihydric alcohol.

7 Claims, No Drawings

PULVERULENT COATING AGENTS BASED ON BLOCKED AROMATIC DIISOCYANATES

This invention relates to pulverulent coating agents adapted for use by spreading on a substrate and curing at an elevated temperature.

According to German Offenlegungsshrift No. 1,957,483 and German Offenlegungsschrift No. 20 64 098 pulverulent mixtures of high-melting polyester resins and/or polyethers and/or polyurethanes and/or polyester-urethanes and/or alkyd resins and/or urethane-alkyd resins and/or vinyl polymers and/or epoxide resins, containing hydroxyl groups, can be used, in combination with ε-caprolactam-masked polyisocyanates, as powder lacquers.

The polyisocyanates masked with ε-caprolactam can also be ε-caprolactam-masked adducts of more-than-dihydric alcohols with polyisocyanates, such as, for example, the tris-ε-caprolactam-masked adduct of 1 mol of trimethylolpropane with 3 mols of toluylenediisocyanate and 3 mols of caprolactam.

This invention now provides a pulverulent coating agent curing at a temperature above 130°C, preferably between 150°C and 210°C, comprising
   a. at least one polymer containing hydroxyl groups and having a softening point of at least 40°C;
   b. an ε-caprolactam-masked adduct of an aromatic polyisocyanate preferably an aromatic diisocyanate, a dihydric alcohol, preferably a dihydric ether-alcohol, and ε-caprolactam.

The agent may include also a catalyst and further customary additives.

The invention also provides a process for forming a coating on a substrate comprising spreading the pulverulent coating agent of the invention on the substrate and heating to above 130°C, preferably between 150 and 210°C, to cure the agent and form a continuous coating.

In the coating agent according to the invention, the ε-caprolactam-masked adduct, component (b), acts as a cross-linking agent for the polymeric component (a).

The adducts of diols, polyisocyanates and ε-caprolactam are preferably manufactured with the molar ratio (calculated for diols, diisocyanates and ε-caprolactam) of 1 to 0.5 (diol) to 2 (diisocyanate) to 2 - 3 (ε-caprolactam), with the number of equivalents (= mols) of ε-caprolactam to be employed preferably being so calculated in each case that it does not exceed the difference between the isocyanate equivalents and OH equivalents. If polyisocyanates with more than 2 NCO groups per molecule are used instead of, or in addition to, diisocyanates, correspondingly recalculated molar ratios or equivalent ratios apply.

In the coating agents according to the invention, the component (b) should preferably in each case be present in amounts of between about 10% by weight and about 100% by weight, preferably between about 20% by weight and about 50% by weight, relative to the weight of the component or components (a).

Suitable polymers containing hydroxyl groups are polyester resins containing hydroxyl groups and/or polyethers containing hydroxyl groups and/or polyurethanes containing hydroxyl groups and/or polyester-urethanes containing hydroxyl groups and/or alkyd resins containing hydroxyl groups and/or urethane-alkyd resins containing hydroxyl groups and/or vinyl polymers containing hydroxyl groups and/or epoxide resins containing hydroxyl groups.

The pulverulent coating agents according to the invention are distinguished by a combination of good properties.

They have a storage stability of more than 10 days at 40°–45°C and can be processed at a stoving temperature of only 170°C, without the use of additional catalysts, to give lacquerings of good elasticity and good resistance to acetone. Under comparable conditions, this is only possible with the powder lacquer binders of German Offenlegungsschrift No. 1,957,483 (Example 1) under substantially less favourable conditions (stoving temperature 200°C).

The result is surprising since for powder lacquer binders with storage stabilities above 40°C, which are intended to give elastic, acetone-resistant lacquerings, only high-melting polyesters in combination with strongly elasticising crosslinking agents, for example based on hexamethylenediisocyanate or isophoronediisocyanate, are suitable for use; these combinations can however only be processed to give good lacquerings, even in the presence of catalysts, at minimum stoving temperatures of 180°C, whilst in the absence of catalysts stoving temperatures of at least 200°C are needed.

The unique properties of crosslinking agents based on ε-caprolactam-masked adducts of aromatic polyisocyanates, diols and ε-caprolactam, namely an improvement in the storage stability, high elasticity of stoved powder lacquer films and the possibility of achieving optimum results already at stoving temperatures of 170°C, opens up a multiplicity of possible combinations of these crosslinking agents with polyester resins and/or polyethers and/or polyurethanes and/or polyester-urethanes and/or alkyd resins and/or urethane-alkyd resins and/or vinyl polymers and/or epoxide resins which contain hydroxyl groups.

Examples of aromatic isocyanates which are suitable for the manufacture of the new crosslinking agents are: toluylenediisocyanates, naphthylenediisocyanates diphenylmethane-4,4'-diisocyanate and triphenylmethane-4,4',4''-triisocyanate.

Products of the general formula

are suitable for use as diol components; in these,

R denotes an optionally substituted aliphatic radical with 2 to 8 carbon atoms in the chain, of which up to 2 carbon atoms can be replaced by hetero-atoms or groups containing hetero-atoms,

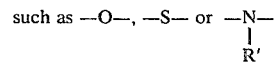

wherein

R' can represent hydrogen or any $C_1$-$C_3$-alkyl, phenyl, toluyl or benzyl groups.

As examples of diols there may be mentioned: ethylene glycol, propanediols, butanediols, hexanediols, diethylene glycol, triethylene glycol, thiodiglycol or N-methyldiethanolamine. Ether-alcohols, such as diethylene glycol or triethylene glycol, are employed as preferred diols. Mixtures of diols can also be used.

The procedure followed for the manufacture of the crosslinking agents according to the invention, based on the abovementioned ε-caprolactam-masked adducts, is generally such that in the end product the molar ratio of diisocyanates to diols is 2.0 to 4.0, preferably 2.1 to 2.7. The remaining equivalents of isocyanate groups are blocked with -caprolactam. It is also possible to manufacture products which are not completely blocked with caprolactam; however, care must be taken that not more than one isocyanate group should be present free per molecule of crosslinking agent, since otherwise crosslinking can already occur on mixing the crosslinking agents with the resins containing hydroxyl groups.

Lacquerings with particularly good levelling are in particular obtained with the crosslinking agents according to the invention based on diethylene glycol, toluylene diisocyanate and ε-caprolactam in the molar ratio of 0.7 –0.9 (diethylene glycol) : 2 (toluylenediisocyanate) : 2 (ε-caprolactam).

The crosslinking agents according to the invention can be manufactured by first reacting the diisocyanates at 40°C to 160°C, preferably at 80° to 140°C, with the diols and subsequently carrying out the reaction with ε-caprolactam in the same temperature range. It is also possible to proceed conversely and first to react the diisocyanates at 40° to 120°, preferably at 80° to 120°, with caprolactam and subsequently at 80° to 160° with the diols. A combination of both processes, namely first to react the diisocyanates with a part of the diols or of the caprolactam, then with a part of the caprolactam or of the diols, and then again with the remaining part of the diols or of the caprolactam, is also possible.

The polyester resins and/or polyurethanes and/or polyester-urethanes and/or alkyd resins and/or urethane-alkyd resins, containing hydroxyl groups, which according to the invention are to be used in combination with the new crosslinking agents can be manufactured in accordance with processes which are in themselves known, preferably from cyclic polycarboxylic acids, such as phthalic acid, isophthalic acid, terephthalic acid, benzene-1,2,4-tricarboxylic acid, 3,6-dichlorophthalic acid, tetrachlorophthalic acid, tetrahydrophthalic acid, hexahydrophthalic acid, endomethylenetetrahydrophthalic acid or, where these are accessible, their anhydrides or lower alkyl esters, and trimellitic anhydride, as well as from diols, such as ethylene glycol, 1,2-propanediol, 1,3-propanediol, 1,2-butanediol, 1,4-butanediol, 2,2-dimethylpropanediol, hexanediol-2,5, hexanediol-1,6, 4,4'-dihydroxycyclohexylpropane-2,2, cyclohexanediol, dimethylol cyclohexane, diethylene glycol and 2,2-bis-[4-(β-hydroxy-ethoxy)-phenyl]-propane and polyols, such as glycerine, hexanetriol, pentaerythritol, sorbitol, trimethylolethane, trimethylolpropane and tris-(β-hydroxyethyl)-isocyanurate.

A proportion of co-condensed monocarboxylic acids, for example benezoic acid, tert.-butylbenzoic acid, hexahydrobenzoic acid and saturated and/or unsaturated fatty acids as well as acyclic polycarboxylic acids, such as adipic acid, maleic acid and succinic acid, can be contained in the product. Amongst polyisocyanates, hexamethylenediisocyanate, isophoronediisocyanate, toluylenediisocyanates, naphthyldiisocyanates, diphenylmethane-4,4'-diisocyanate, dicyclohexylmethane-4,4'-diisocyanate and triphenylmethane-4,4',4''-triisocyanate can be used, whilst amongst monoisocyanates ethylisocyanate or phenylisocyanate can be used.

The polyesters are manufactured in a manner which is in itself known, by esterification or transesterification, if appropriate in the presence of customary catalysts, and through suitable choice of the COOH/OH ratio end products are obtained of which the hydroxyl numbers lie between 40 and 250, preferably between 40 and 150. The hydroxyl numbers of the remaining abovementioned polymers should lie in the same range.

Usable polyvinyl resins containing hydroxyl groups, with hydroxyl numbers of between 40 and 250, preferably between 40 and 150, are manufactured in a manner which is in itself known by copolymerisation of the corresponding monomers, for example hydroxy-propyl-(meth)-acrylic acid ester, hydroxy-ethyl(meth)acrylic acid ester, ethyl acrylate, butyl acrylate, 2-ethylhexyl acrylate, methyl methacrylate, ethyl methacrylate, butyl methacrylate, lauryl methacrylate, styrene, α-methylstyrene, vinyltoluene, acrylonitrile, acrylamide, vinyl acetate, acrylic acid and methacrylic acid, in the presence of initiators and regulators.

Polyethers which can be used, for example from ethylene oxide and/or propylene oxide are also known.

The situation is similar with polyepoxide resins. The most customary are reaction products of 2,2-bis-(4-hydroxyphenyl)-propane (bisphenol A) and epichlorohydrin.

The softening points of the mixtures of resin and crosslinking agent must be so low that they can be processed at temperatures of between 80° and 130° with the additives necessary for the manufacture of the coating agents according to the invention. On the other hand, the softening points of the mixtures must be so high that the coating agents according to the invention can be ground to give free-flowing powders of particle size 20 to 120 μ, which do not form lumps. In practice this means that the resins employed have softening points of between 40° and about 140°, as determined by differential thermoanalysis.

The coating agents can be produced in suitable mixing apparatuses, for example in stirred kettles or mixing screws. Customary additives, such as pigments, levelling agents, fillers and catalysts, for example the compounds mentioned in German Pat. Spec. No. 946,173, can also be added.

The crosslinking agent itself is preferably employed in such amounts that the ratio of hydroxyl groups of the resin: masked + optionally free NCO groups of the crosslinking agent is between 0.5 and 6.0, preferably between 0.7 and 1.5.

The products according to the invention can be converted into powders, the free-flowing characteristics of which remain preserved even on prolonged storage at temperatures of about 40°C. These powders can be applied to substrates in the customary manner, especially in accordance with the electrostatic powder spraying process.

On heating to temperatures above 130°C, preferably between 150°C and 210°C, the lacquer films rapidly cure to give coatings having very good properties.

Shaped articles which can be coated may consist for example of metal, glasses and ceramics.

MANUFACTURE OF THE CROSSLINKING AGENTS

EXAMPLE 1

(Molar ratio: 0.86 diol : 2.0 diisocyanate : 2.0 ε-caprolactam)

25,056 parts by weight (145 mols) of toluylenediisocyanate (Desmodur T 65, a commercial product consisting of an isomer mixture of 2,4- and 2,6-toluylenediisocyanate) are warmed to 90°C in a stirred kettle, whilst passing nitrogen over the material. A total of 16,372 parts by weight (145 mols) of ε-caprolactam is added in several portions over the course of one hour and the mixture is stirred at 90°C until an NCO value of approx. 16% is found. A total of 6,552 parts by weight (62 mols) of diethylene glycol is added dropwise, in several portions, over the course of 4 hours, and the temperature is at the same time raised to 140°C. The mixture is further stirred until the NCO content is about 0.5 – 2%.

Characteristic Data
Viscosity 116 seconds (55% strength in ethyl glycol acetate, according to DIN 53,211)
free NCO: 0.5 – 2%
softening point (S.P.) approx. 70°C
(according to the DTA method: R. C. Mackenzie, Differential Thermal Analysis, London, 1970, Vol. 1.

EXAMPLE 2

(Molar ratio: 0.86:2.0:2.0)

940 parts by weight of Desmodur T 65 were warmed to 80°C. After adding 123 parts by weight of diethylene glycol in portions, the NCO value is approx. 34%. The temperature is raised to 100°C, 610 parts by weight of -caprolactam are added in several portions and the mixture is further stirred until the NCO value is approx. 9%. During the addition of a further 123 parts by weight of diethylene glycol the temperature is raised to 140°C and the mixture is run out after an NCO value of 0.5 – 2% has been reached.

Characteristic Data
Viscosity: 70 seconds (55% strength in ethyl glycol acetate, according to DIN 53,211)
free NCO: 0.5 – 2%.

EXAMPLE 3

(Molar ratio: 1.0 ; 2.0 : 2.0)

870 parts by weight of Desmodur T 65 are warmed to 80°C. 295 parts by weight of hexane-1,6-diol are added in portions over the course of 1½ hours and at the same time the temperature is allowed to rise to 100°C. When an NCO value of approx. 18% is measured, 565 parts by weight of ε-caprolactam are added in several portions and the mixture is heated to 130°C. After reaching 0.5–2% of NCO, the mixture is run out.

Characteristic Data
Viscosity: 86 seconds (55% strength in ethyl glycol acetate, according to DIN 53,211)
free NCO: 0.5 – 2%.

COMPARISON EXPERIMENT 1

(Molar ratio: 1:2:2)

888 parts by weight of 1-isocyanato-3-(isocyanatomethyl)-3,5,5-trimethylcyclohexane are reacted in portions with 452 parts by weight of ε-caprolactam at 80° until an NCO content of approx. 13% is reached. 212 parts by weight of diethylene glycol are then added dropwise and the temperature is raised to 140°C. The mixture is further stirred until the NCO value is < 2%.

Characteristic Data
Viscosity: 73 seconds (55% strength in ethyl glycol acetate according to DIN 53,211)
free NCO: < 2%

COMPARISON EXPERIMENT 2

(Molar ratio: 1:2:2)

A crosslinking agent is manufactured analogously to Comparison Experiment 1 from 33.6 parts by weight of hexamethylenediisocyanate, 22.6 parts by weight of ε-caprolactam and 10.6 parts by weight of diethylene glycol. The product is liquid at room temperature.

Characteristic Data
Viscosity: 17 seconds (55% strength in ethyl glycol acetate according to DIN 53,211)
free NCO: < 2%

Manufacture of Powder Lacquerings

The parts by weight, indicated below, of a polyester manufactured from bis-oxyethylbisphenol A, glycerine and terephthalic acid in accordance with known processes (acid number: 10; OH number: 48; softening point approx. 70° (DTA); viscosity: 155 seconds (50% strength in xylene/n-butanol, 9:1, according to DIN 53,211)) are intimately mixed with the crosslinking agents of Example 1 in the case of powder lacquer A and of Comparison Experiment 1 in the case of powder lacquer B, a rutile titanium dioxide pigment and a levelling agent based on cellulose (a product of Messrs. Borchers) on an edge runner mill and subsequently homogenised in an extruder at 90° – 110°C. After cooling, the ribbon is ground by means of a pinned disc mill to a particle size of less than 100 μ. The particles thus produced are applied to the substrate by means of an electrostatic powder spraying installation at 60 kV and then stoved for 20 minutes at 170°C.

| Powder Lacquer | Parts by Weight of Polyester | Parts by Weight of Crosslinking Agent from Example | Levelling Agent | TiO$_2$ |
|---|---|---|---|---|
| A | 100 | 30 (Example 1) | 1.3 | 87 |
| B | 100 | 30 (Comparison Experiment 1) | 1.3 | 87 |

The powder lacquers A and B can be stored for at least 10 days at 40° – 45°C without losing their free-flowing character; they give lacquerings having the following properties:

| Powder Lacquer | Stoving Time-Temperature | Coating Thickness | Erichsen Deep-drawing Value | Acetone Resistance |
|---|---|---|---|---|
| A | 20', 170°C | 70 μ | 10 mm | resistant |
| B | 20', 170°C | 70 μ | 1.0 mm | not resistant |

Lacquering B is only elastic after a stoving time of 30 minutes at 180°C with zinc N-ethyl-N-phenyl-dithiocarbamate as the catalyst or after a stoving time of 15 minutes at 200°C without a catalyst.

Powder lacquer binders manufactured from the above-mentioned polyester and Comparison Experiment 2 are not stable on storage.

It can be seen from the present comparison that only the powder lacquer A according to the invention displays a combination of improved properties, namely a storage stability of at least 10 days at 40° – 45°C and stoving temperatures, without catalyst, of 170°C, as well as acetone resistance and high elasticity of the lacquerings stoved at 170°C. If powder lacquer B is used, stoving temperatures of 170°C only yield non-elastic lacquerings which are not resistant to acetone.

Analogous processing of the crosslinking agent described in Comparison Experiment 2 does not achieve the objective, since a corresponding mixture with the above-mentioned polyester (100 parts by weight of polyester + 30 parts by weight of crosslinking agent) already forms lumps at room temperature. If less than 30 parts by weight, for example 10 parts by weight, of crosslinking agent of Comparison Experiment 2 are used, powder lacquers can admittedly be produced with the abovementioned polyester; however, lacquerings stoved for 20 minutes at 170°C are non-elastic and not resistant to acetone.

What we claim is:

1. A pulverulent solvent-free coating agent curable at a temperature of above 130°C. comprising
   a. at least one polymer containing hydroxyl groups and having a softening temperature of at least 40°C. and
   b. a crosslinking amount of an adduct of an aromatic diisocyanate, a dihydric alcohol, and ε-caprolactam, said dihydric alcohol being selected from the group consisting of ethylene glycol, propanediol, butanediol, hexanediol, diethyleneglycol, triethyleneglycol, thiodiglycol, N-methyldiethanolamine and mixtures thereof and said dihydric alcohol, diisocyanate and ε-caprolactam being present in said adduct in the molar ratio of 0.5–1: 2:2–3.

2. The coating agent of claim 1 wherein said dihydric alcohol is diethyleneglycol or triethyleneglycol.

3. The coating agent of claim 1 wherein said adduct contains diethylene glycol, toluylene diisocyanate and ε-caprolactam in a molar ratio of 0.7–0.9: 2.0:2.0.

4. The coating agent of claim 1 wherein component (b) is present in an amount of 10 to 100% by weight based on the weight of component (a).

5. The coating agent of claim 1 wherein component (b) is present in an amount of 20 to 50% by weight based on the weight of component (a).

6. The coating agent of claim 1 wherein the ratio of hydroxyl groups present in component (a) to the total number of masked and any free isocyanate groups of component (b) is between 0.5 and 6.0.

7. The coating agent of claim 1 wherein the ratio of hydroxyl groups present in component (a) to the total number of masked and any free isocyanate groups of component (b) is between 0.7 and 1.5.

* * * * *